United States Patent [19]

Shaw

[11] Patent Number: 4,702,033

[45] Date of Patent: Oct. 27, 1987

[54] DOWNRIGGER CABLE ACCESSORY

[75] Inventor: Byron Shaw, Davison, Mich.

[73] Assignee: Blue Water Research, Inc., Lapeer, Mich.

[21] Appl. No.: 931,526

[22] Filed: Nov. 17, 1986

[51] Int. Cl.[4] .............................................. A01K 91/06
[52] U.S. Cl. ..................................... 43/43.12; 43/43.1
[58] Field of Search ............... 43/4, 43.1, 43.12, 44.88

[56] References Cited

U.S. PATENT DOCUMENTS

| | | | |
|---|---|---|---|
| 3,785,079 | 1/1974 | Rohn | 43/43.12 |
| 4,286,403 | 9/1981 | Rogers | 43/43.12 |
| 4,628,630 | 12/1986 | Bohme | 43/43.12 |

OTHER PUBLICATIONS

Pacific-Atlantic Products, Inc., "Walker Downriggers".
Invader Downriggers catalog.
Cannon catalog.

Primary Examiner—M. Jordan
Attorney, Agent, or Firm—Beaman & Beaman

[57] ABSTRACT

An accessory for use with the cable of a downrigger for positioning the fishing line at a predetermined depth while trolling. The downrigger cable extends through the accessory body which includes a roller for engaging the cable during cable and weight retrieval and a cord attached to the body permits the downrigger weight to be pulled inboard. Additionally, the accessory includes a lower region shaped to engage stacked fishing line releases mounted on the cable to dislodge the releases as they engage the accessory to prevent wear of the release pads.

9 Claims, 12 Drawing Figures

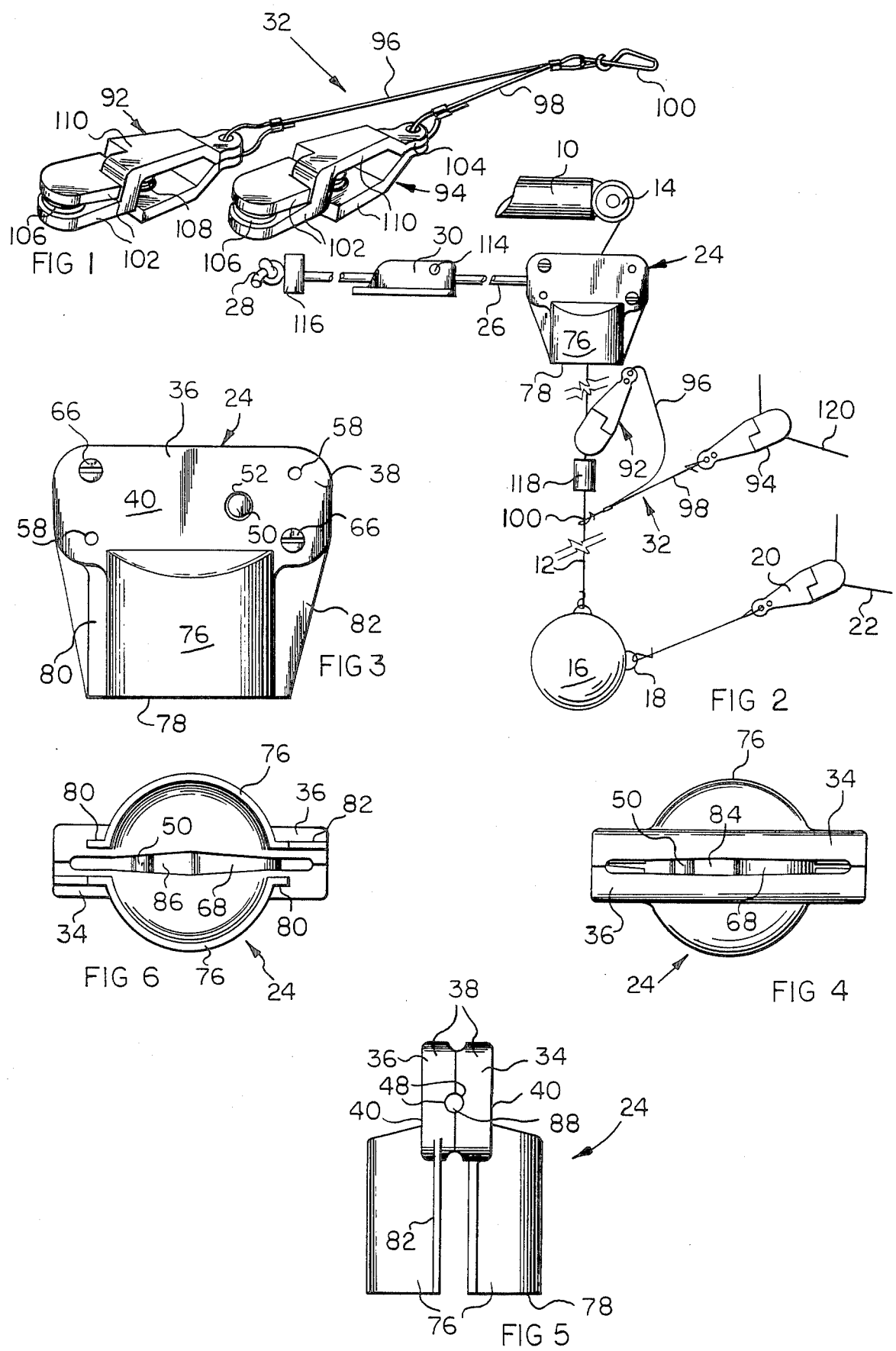

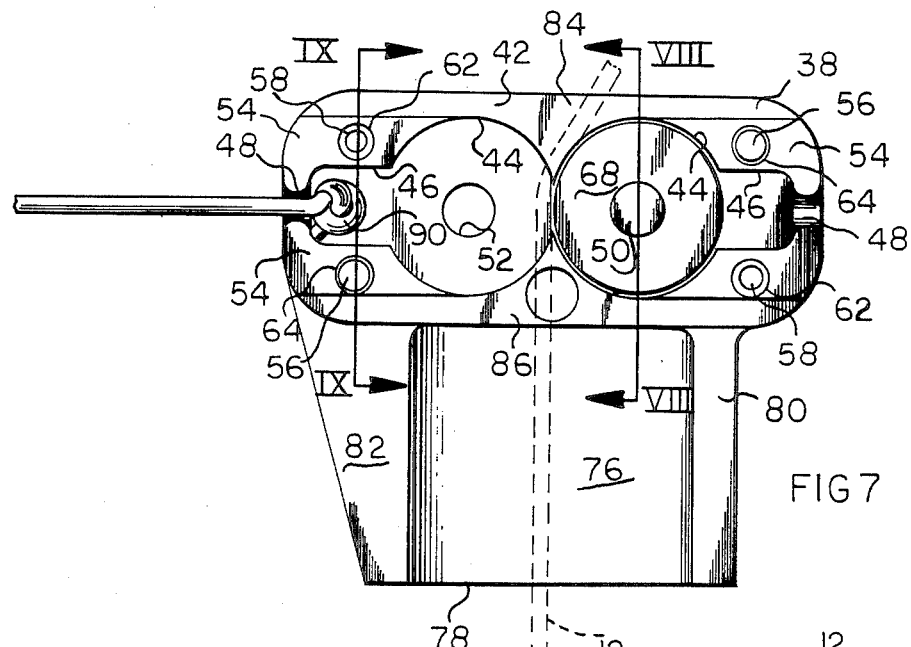
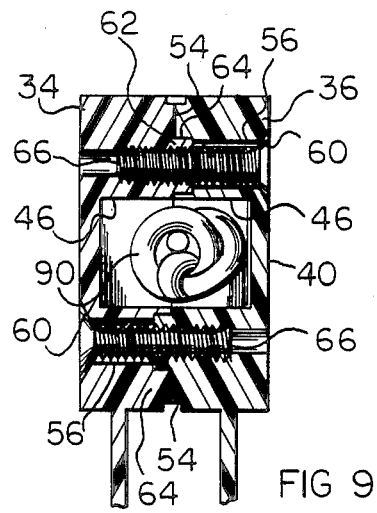
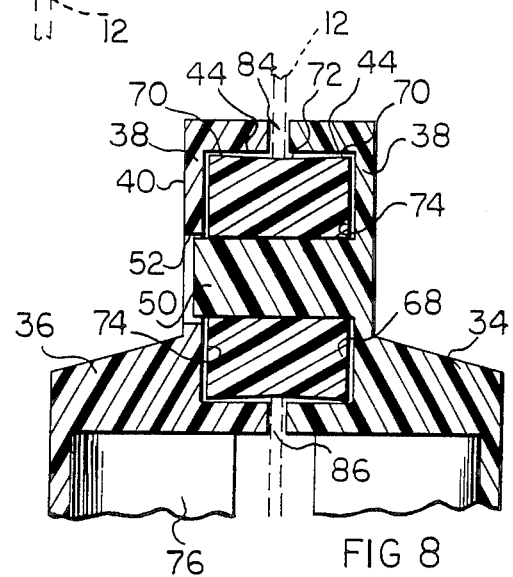
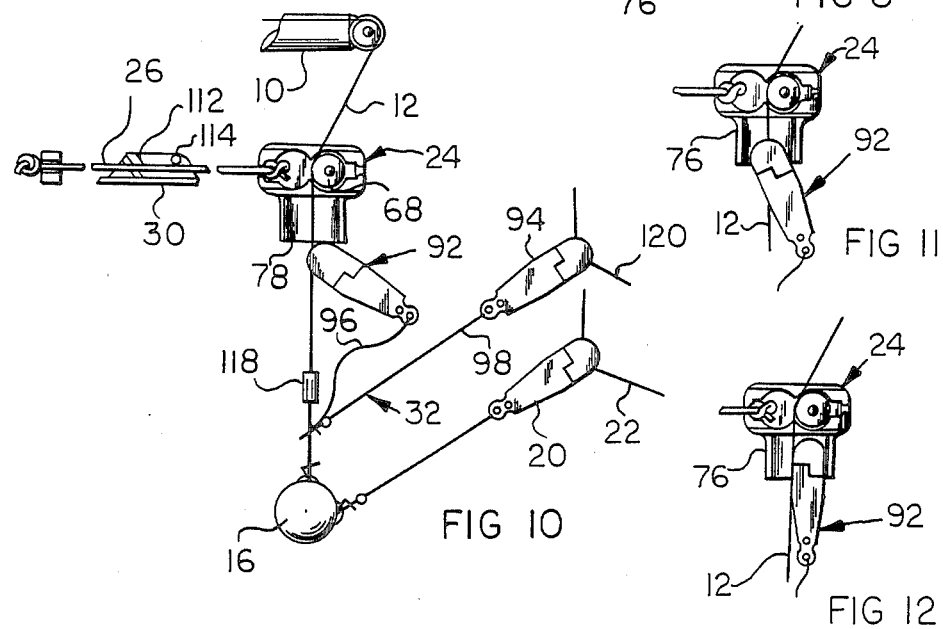

DOWNRIGGER CABLE ACCESSORY

BACKGROUND OF THE INVENTION

When trolling for salmon and other fish species commonly found at substantial depths, it is common to use downrigger apparatus for locating the lure at the desired depth. The downrigger apparatus normally consists of a rigid elongated boom mounted upon the boat having a free end which projects from the boat stern. A cable reel is mounted at the inner end of the boom accessible from the boat cockpit, and the cable extends over a pulley located at the boom outer end. A heavy weight, commonly referred to as a "cannonball", is affixed to the cable end and may be lowered to the desired fishing depth.

A fish line release is attached to the weight, or adjacent thereto, and releasably holds the fishing line at the desired depth. Upon the lure being firmly struck by a fish, the line is pulled from the release, and the fishing line retrieved by the usual pole and reel.

It is common to attach more than one fish line to a single downrigger, and several line releases may be "stacked" for this purpose. A common method for stacking is to interconnect a pair of line releases, one line release being attached to the downrigger cable, and the other holding the fish line in the normal manner. However, as a retriever may be used with the downrigger cable for retrieving the weight as it approaches the boom, the engagement of a cable attached release with the retriever will cause the cable to be pulled through the release harming the jaws thereof, and there is a need for "stripping" or dislodging the cable attached release from the cable upon engagement with the cable retriever.

Downrigger cable and weight retrievers basically consist of a roller or pulley device located adjacent the boom through which the cable extends. A cord attached to the retriever releasably positioned and locked from the boat cockpit permits the retriever to be located below the boom outer roller during normal operation of the downrigger, but permits the cable and weight to be pulled inboard toward the cockpit as the weight is raised to the boom. The retriever provides control of the position of the weight during retrieving, controls swinging and pendulous weight movement, and permits the downrigger weight to be pulled aboard, as is often done when a fish is hooked, and when attaching the line to a release.

It is an object of the invention to provide a downrigger cable accessory of eonomical construction which effectively retrieves the weight and cable when raised and permits control and positioning of the cable during retrieval.

Another object of the invention is to provide a downrigger cable accessory having the dual function of retrieving the weight as it is raised to the boom and dislodging stacked line releases attached to the cable as the cable is raised to prevent damage to the stacked fish line release apparatus.

A further object of the invention is to provide a downrigger cable accessory having the dual function of retrieving the downrigger cable and weight as it is raised and dislodging stacked fish line releases from the cable during cable retrieval wherein the accessory body is formed of identical interconnected parts molded of noncorrosive synthetic plastic.

Yet another object of the invention is to provide a downrigger cable accessory utilizing a roller wherein the lateral regions of the roller are confined and inaccessible to insure proper orientation of the cable to the roller periphery under all conditions and positions of the accessory.

A downrigger cable accessory embodimeht of the invention consists of a pair of identical molded synthetic plastic components assembled by four screws to define a body having upper and lower regions. The upper region of the body includes an internally located roller rotatably mounted upon a shaft and guides for the downrigger cable.

Additionally, the upper region of the body includes a cavity for receiving the inner knotted end of a cord whereby the accessory may be pulled inboard during retrieval of the weight.

The roller is located within aligned recesses within the body halves wherein the lateral sides and regions of the roller are not exposed to the cable, and the cable is limited to engagement with the central peripheral region of the roller. This construction prevents the downrigger cable from being improperly oriented to the roller regardless of the position of the accessory on the cable.

The lower region of the accessory body is of a tubular configuration, through which the downrigger cable extends, defining a lower annular abutment edge which engages stacked fish line releases attached to the cable as the cable is pulled upwardly through the body. Upon the cable attached stacked fish line release engaging the body, the release is pivoted relative to the cable and automatically dislodged therefrom preventing wear of the fish line release pads which engage the cable as would occur if the fish line release remained frictionally grasping the cable as the cable is pulled through the accessory body.

The accessory of the invention is inexpensively manufactured of components produced by high production techniques, and the parts will not corrode or malfunction.

BRIEF DESCRIPTION OF THE DRAWINGS

The aforementioned objects and advantages of the invention will be appreciated from the following description and accompanying drawings wherein:

FIG. 1 is a perspective view of a fish line stacker using releases of the type dislodgeable with the downrigger cable accessory of the invention, FIG. 2 is an elevational, partial view of the relationship of downrigger and fish line components as commonly employed, FIG. 3 is a side, elevational view of the downrigger cable accessory in accord with the invention, FIG. 4 is a top view of FIG. 3, FIG. 5 is an end, elevational view as taken from the right of FIG. 3, FIG. 6 is a bottom view as taken from the bottom of FIG. 3, FIG. 7 is an enlarged, elevational view of the inner surface of one of the body halves of a cable accessory in accord with the invention, FIG. 8 is an enlarged, detail, elevational, sectional view as taken along Section VIII—VIII of FIG. 7, FIG. 9 is an enlarged, detail, elevational, sectional view as taken along Section IX-IX of FIG. 7, and FIGS. 10-12 are schematic, sequential, elevational views illustrating the dislodging of a stacked fish line release from the cable, the accessory body being shown in a partial assembled schematic manner.

DESCRIPTION OF THE PREFERRED EMBODIMENT.

The use of a downrigger cable accessory in accord with the invention is best appreciated from FIGS. 2 and 10. In these figures, a conventional downrigger boom 10 is partially illustrated, the outer end thereof being shown in full lines. The inner end of the boom, not shown, is mounted to a boat deck adjacent the cockpit in the known manner wherein the boom may usually be elevated or pivoted, and a reel, not shown, is mounted upon the boom inner end upon which the boom cable 12 may be wound. The outer end of the boom includes a roller 14 over which the downrigger cable 12 passes, and the lower end of the cable is affixed to the heavy "cannonball" weight 16. The weight 16 usually includes an eyelet 18, or other means, for attaching a fish line release 20 to the weight, and the fish line release 20 frictionally grasps the fish line 22 permitting the fish line lure to be positioned at the desired predetermined depth during trolling.

The accessory in accord with the invention, generally indicated at 24, is located immediately below the boom outer end, and the downrigger cable 12 passes therethrough. The accessory 24 includes a flexible cord 26 having an outer knotted end 28 adjacent the boat cockpit, not shown, and a cord line lock 30 is attached to the boat deck, or downrigger boom, for locking the cord as desired. As the cable 12 passes through the accessory 24 tensioning the cord 26 will pull the accessory, cable 12 and weight 16 toward the boat cockpit, and the accessory 24 will permit the weight, as it nears the boom 10, to be pulled inboard by the operator.

In addition to retrieving and locating the cable 12 and weight 16, the accessory 24 also "strips" or dislodges fish line stackers, generally indicated at 32, which may be mounted on the downrigger cable above the weight. The construction and operation of the stacker 32 is later described.

The accessory 24 comprises a body primarily formed of two identical body halves 34 and 36 molded of a noncorrosive synthetic plastic material such as acetal resin. The upper region 38 of an accessory body half is of a generally rectangular configuration planar on the outside surface 40, and the inside surface 42 is formed with a configuration best appreciated from FIGS. 7 and 8.

The inside surface 42 of the upper body regions 38 is formed with a pair of circular recesses 44 of a depth which will be appreciated from FIG. 8. The recesses 44 include radial pockets 46 and passages 48 are defined in the upper regions intersecting the pockets 46 for forming an opening into the body for receiving the cord 26, as later described.

Centrally, one of the recesses 44 is provided with a stub axle shaft 50, FIG. 8, while the other recess is centrally provided with a hole 52 of a diameter slightly greater than that of the shaft 50 for receiving the outer end of the shaft of the other body half.

The inner surfaces 42 of the body upper regions 38 are formed with bosses 54, FIGS. 7 and 9, and four holes extend through the upper regions inner and outer sides. Two of the holes 56, at opposite "corners", are larger than the opposite holes 58, and are countersunk at 60, FIG. 9, for receiving the head of a connecting screw, as later described. The other two holes 58 are of a slightly smaller diameter and are provided with a concentric tubular projection 62, FIG. 9, for engaging the concentric counterbore 64 defined in the larger holes 56 when the body parts 34 and 36 are assembled. Thus, the projections 62 and counterbores 64 will interlock to form a preliminary assembly orientation prior to final assembly by the screws 66.

A synthetic plastic roller 68 is rotatably mounted upon the stub axle shaft 50 and includes a periphery of a slightly concave configuration having lateral regions 70 and a central region 72, FIG. 8. The roller 68 also includes lateral sides 74, and as will be appreciated from FIG. 8, the periphery lateral regions 70 are closely received within opposed recesses 44, and as later described, this relationship prevents the cable 12 from being improperly oriented to the roller.

The lower half of the body halves 34 and 36 consists of a semi-cylindrical shell 76 of elongated configuration terminating in a lower abutment edge 78. The lateral edges of the shell portion 76 are formed with radially extending flanges 80 and 82, and the flange 82 is of greater radial dimension as to provide a "clipping" surface for a line release, as later described.

The accessory body halves 34 and 36 are interconnected by the four screws 66, two of the screws being inserted into the holes 56 from one direction wherein the flat head countersunk configuration of the screw heads is received within the countersunk portions 60, while the other screws are inserted from the other side of the accessory for receipt within the holes 56 in the other direction. As apparent in FIG. 9, the screws 66 thread into the aligned smaller holes 58 and will maintain the body portions in the assembled relationship shown in FIGS. 2–6, 8 and 9.

The presence of the bosses 54 results in a slot 84 being defined in the upper edge of the accessory 24, FIG. 4, through which the cable 12 extends for engaging the periphery of the roller 68 as shown in dotted lines in FIG. 7. Likewise, a lower slot is defined at 86, FIG. 6, whereby the cable may centrally extend through the cylindrical chamber defined by the semi-cylindrical shell portions 76.

Additionally, upon assembly of the body halves 34 and 36, the semi-cylindrical passages 48 form a circular opening 88, FIG. 5, in the end of the body through which the cord 26 may pass, and the inner end of the cord is knotted as at 90, for firmly affixing the cord to the accessory body, FIG. 7.

FIG. 1 illustrates the type of fish line release stacker assembly 32 which may be used with the accessory 24 for automatic removal from the downrigger cable as the cable is retrieved. The stacker assembly 32 includes a pair of identical releases 92 and 94, the release 92 including a tether 96 while the release 94 has the tether 98 affixed thereto. The outer ends of the tethers 96 and 98 are connected to a releasable eyelet 100.

The line releases 92 and 94 are identical and consist of a pair of jaw members 102 pivotally attached together at the inner end 104 and the outer portion of the jaw members includes rubber pads 106. The jaw members are biased toward each other by a compression spring 108 interposed between the jaw member central regions 110 tending to close the jaw member outer ends and pads 106. By squeezing the central regions 110 the jaw members are opened permitting access to the pads 106, and a fish line or downrigger cable may be placed therebetween. Fish line releases of this type are currently manufactured and marketed by the assignee, and are described in greater detail in copending Ser. No. 06/896,522, filed Aug. 14, 1986.

The previously described apparatus is installed and used as set forth below.

Initially, the accessory body halves 34 and 36 will be separated and the components of the accessory disassembled. The roller 68 is first placed upon the stub shaft 50 of either body half, 34, for instance. A knot 90 is tied in the end of cord 26 and placed in the pocket 46 furthest from the roller 68. The body 34 is then positioned to the downrigger cable 12 as shown in FIG. 7 wherein the cable, shown in dotted lines, will be located adjacent the roller periphery. The other body half 36 is then snapped onto body half 34 by the reception of the projections 62 into the counterbores 64 and the screws 66 are inserted and tightened. This assembly of the body halves 34 and 36 will locate the cable 12 within the slots 84 and 86, FIG. 8, and between the roller 68 and the stub shaft 50 formed on body half 36.

The line lock 30 has been attached to the boat, or downrigger, and includes the wedge teeth 112, and cord retainer shaft 114 in the known manner. Thereupon, a shock absorbing washer 116 may be mounted on the outer end of the cord, and the cord knotted at 28.

When the accessory 24 is used only as a retriever for the downrigger cable 12 and weight 16, the cord 26 will be positioned so that the accessory will be located below the boom roller 14 and the cable 12 freely passes therethrough. Of course, as the accessory 24 is "loosely" located on the cable 12, it will assume a number of orientations to the vertical due to the boat and cable movement, but as the slots 84 and 86 confine the cable within the accessory, and as the roller 68 and non-roller supporting stub shaft 50, FIG. 4, position the cable relative to the roller, and as the lateral regions 70 of the roller are located within the recesses 44, it is not possible for the cable to be improperly oriented to the roller and the cable will engage the roller only at the central region 72.

When the weight 16 is retrieved by winding the cable upon the boom reel, not shown, the cable 12 is pulled up through the accessory 24, and as the weight 16 approaches the boom, pulling upon the cord 26 will draw the cable, and weight, toward the boat cockpit permitting the operator to reach the weight and place it within the cockpit. As the tensioning of the cord 26 will pull the roller 68 into engagement with the cable 12, the cable will freely roll upon the roller and no undue wear of the accessory occurs, the cable is not worn, and little resistance to the winding of the cable is created.

If it is desired to "stack" one or more additional fishing lines on a single boom cable, this may be accomplished by using the stacker 32 as shown in FIG. 1. When using the stacker 32 the eyelet 100 is opened permitting the eyelet to be attached to the cable 12 as shown in FIGS. 2 and 10. A resilient shock tube 118 is usually placed upon the cable, and the fish line release 92 is squeezed to open its jaws and permit the release to frictionally grasp the downrigger cable 12 as shown in FIG. 2. The attaching of the release 92 to the downrigger cable will vertically orient the stacker 32 on the cable as desired, and the release 94 is used in the normal way to position a second fish line 120 at a predetermined depth.

When the downrigger cable 12 is retrieved, the stacker release 92 will engage the accessory 24 and the movement of the release would be terminated causing the cable 12 to be drawn through the jaw pads of the release 92 which would quickly wear a groove in the pads. However, such damage to the stacker release is prevented by the lower tubular shell extension 76 of the accessory defining the abutment edge 78 as described below.

For best results with respect to the dislodging operation of release 92 from the cable 12, the release 92 should be positioned in a substantially vertical orientation as shown in FIG. 2. As the cable 12 is pulled upwardly through the accessory 24 the abutment edge 78 will engage the release 92 and pivot the free end of the release downwardly as shown in FIG. 10. Further upward motion of the cable begins to pull the release 92 into the substantially cylindrical cavity defined by the shell extension portions 76, FIG. 11, and engagement between the edge 78 and the release 92 continues to pivot the release in a direction tending to align the length of the release with the adjacent vertical portion of the cable 12, such pivoting of the release being permitted by the frictional engagement of the pads 106 with the cable.

The diameter of the cavity defined by portions 76 is approximately twice the width of the release 92, and the release 92 cannot enter the shell portion cavity its full extent without the length of the release being parallel to the taut cable 12, as shown in FIG. 12. This parallel relationship is forced onto the release 92 by the shell portions 76 and abutment edge 78 and the release pads 106 are twisted free from the cable 12 as shown in FIG. 12. Once the pads 106 are released from the cable the release 92 will fall from the accessory cavity and the accessory has accomplished a successful disengagement of the release 92 from the cable without imposing excessive wear upon the pads 106.

As the weight 16 is further retrieved, the cable 12 will pass through the eyelet 100, and the stacker 32 will then be located adjacent the weight 16 once the cable release 92 has been dislodged.

As described above, the lower region of the accessory 24 is provided with flanges 82 of sufficient radial dimension to permit a cable release 92 to be temporarily attached thereto to facilitate handling of the stacker assembly 32 when attaching the stacker to the downrigger cable.

From the above description it will be appreciated that the accessory 24 effectively provides the dual purpose of retrieving the downrigger cable and weight as the weight is raised, and also strips the stacker from the downrigger cable to prevent damage to the stacker release. The components of the accessory, except for the screws, are formed of noncorrosive synthetic plastic material capable of being manufactured by high production molding techniques and the apparatus is dependable and foolproof in operation.

It is appreciated that various modifications to the inventive concepts may be apparent to those skilled in the art without departing from the spirit and scope of the invention.

I claim:

1. A downrigger cable accessory for use with a fishing line downrigger including a weight suspended by a cable from a boom to retrieve the weight when raised to adjacent the boom, comprising, in combination, a body, a cable passage defined through said body for receiving the downrigger cable, a roller rotatably supported within said body having an axially extending periphery and lateral sides intersecting said periphery, said roller periphery including a lateral region adjacent each lateral side and a central region intermediate said lateral regions, opposed recesses defined in said body adjacent each roller lateral side receiving the adjacent roller periphery lateral region whereby said roller periphery lateral regions are shielded within said recesses and are inaccessible to engagement with the downrigger cable, said roller periphery central region constituting a portion of said body cable passage, and a flexible cord attached to the body to permit remote displacement of the body to engage the cable with said roller periphery central region.

2. In a downrigger cable accessory as in claim 1, said body being formed of identical half parts, each of said parts having an inner surface, fasteners interconnecting said parts with said inner surfaces in spaced opposed relationship, said recesses for receiving said roller periphery lateral regions being defined in said inner surfaces.

3. In a downrigger cable accessory as in claim 2, wherein said half parts are molded of a synthetic plastic material and said fasteners comprise screws.

4. In a downrigger cable accessory as in claim 1, said roller periphery having a concave configuration wherein the diameter of said lateral regions is greater than the diameter of said central region.

5. A downrigger cable accessory for use with a fishing line downrigger including a weight suspended by a cable from a boom having the dual function to retrieve the weight when raised to adjacent the boom and to remove fish line releases removably attached to the cable comprising, in combination, a body having an upper region, a lower region, and a vertical axis, a roller mounted in said body upper region for rotation about an axis transversely disposed to said vertical axis and having a periphery, a cable guide passage defined in said body adjacent said roller whereby a cable within said passage engages said roller periphery, a flexible cord affixed to said body, and fish line release engaging means defined on said body lower region for engaging and dislodging fish line releases affixed to the cable as the cable is drawn upwardly through said body cable guide passage.

6. In a downrigger cable accessory as in claim 5, said body lower region comprising a tubular portion having an axis and an open lower end defined by an annular lower edge, the downrigger cable axially extending through said tubular portion, said tubular portion lower edge comprising a fish line release engaging abutment whereby said tubular portion and said lower edge twist the release relative to the cable as the release enters said tubular portion.

7. In a downrigger cable accessory as in claim 6, said body being formed of identical halves molded of a non-corrosive synthetic plastic material, and a plurality of screws interconnecting said halves releasably maintaining the assembly thereof.

8. In a downrigger cable accessory as in claim 7, each of said body halves having an upper section defined by inner and outer sides, first and second sets of holes defined in said body halves upper sections intersecting said sides thereof, an annular projection extending from said halves inner sides concentric with each of said first set of halves, and an annular counterbore concentrically defined in each of said second set of holes intersecting said halves inner sides, said counterbores receiving said projections upon said body halves being assembled, said screws being received within said first and second sets of holes.

9. In a downrigger cable accessory as in claim 1, said roller having lateral sides intersecting said roller periphery, said roller periphery having lateral regions adjacent said roller lateral sides and a central region intermediate said lateral regions, and a recess defined in said body adjacent each roller lateral side and receiving the adjacent lateral region of said roller periphery whereby said roller periphery lateral regions are received within said body recesses and only said roller periphery central region is accessible for engagement by the cable.

* * * * *